United States Patent
Subbian et al.

(10) Patent No.: US 8,649,633 B2
(45) Date of Patent: Feb. 11, 2014

(54) IMAGE REGISTRATION SYSTEM WITH MOVABLE REGION INDICATING SIMILARITY OF ALIGNMENT

(75) Inventors: Palanisamy Onankuttai Subbian, Karnataka (IN); Manivannan Sundarapandian, Bangalore (IN)

(73) Assignee: Siemens Aktiengesellschaft, Munich (DE)

( * ) Notice: Subject to any disclaimer, the term of this patent is extended or adjusted under 35 U.S.C. 154(b) by 565 days.

(21) Appl. No.: 12/960,232

(22) Filed: Dec. 3, 2010

(65) Prior Publication Data

US 2012/0139942 A1    Jun. 7, 2012

(51) Int. Cl.
*G06K 9/32*    (2006.01)

(52) U.S. Cl.
USPC .......................................................... 382/294

(58) Field of Classification Search
None
See application file for complete search history.

(56) References Cited

U.S. PATENT DOCUMENTS

| | | | | |
|---|---|---|---|---|
| 8,081,822 | B1 * | 12/2011 | Bell ............................. | 382/181 |
| 2003/0026469 | A1 * | 2/2003 | Kreang-Arekul et al. .... | 382/132 |
| 2008/0089584 | A1 * | 4/2008 | VanMetter et al. ........... | 382/173 |
| 2009/0003698 | A1 * | 1/2009 | Milward et al. ............... | 382/171 |
| 2009/0088773 | A1 * | 4/2009 | Zhao et al. .................... | 606/130 |

OTHER PUBLICATIONS

Leszczynski, K. W., S. Loose, and S. Boyko. "An image registration scheme applied to verification of radiation therapy." British journal of radiology 71.844 (1998): 413-426.*
Graham, P. A., et al. "Dynamic surface matching for patient positioning in radiotherapy." Information Visualization, 1998. Proceedings. 1998 IEEE Conference on. IEEE, 1998.*
Kanatani, Ken-ichi. "Statistical bias of conic fitting and renormalization." Pattern Analysis and Machine Intelligence, IEEE Transactions on 16.3 (1994): 320-326.*
Sheng, Yunlong, et al. "Real-world multisensor image alignment using edge focusing and Hausdorff distances." AeroSense'99. International Society for Optics and Photonics, 1999.*
Borgefors, Gunilla. "Hierarchical chamfer matching: A parametric edge matching algorithm." Pattern Analysis and Machine Intelligence, IEEE Transactions on 10.6 (1988): 849-865.*

* cited by examiner

*Primary Examiner* — Bhavesh M Mehta
*Assistant Examiner* — Andrew Moyer
(74) *Attorney, Agent, or Firm* — Lempia Summerfield Katz LLC (57) ABSTRACT

An image registration system includes a memory storing digital data representing a first image and a second image, an image processing unit configured to register the second image onto a coordinate system of the first image to obtain a registered second image, and a user interface device adapted to display one of the first image or the registered second image, and a movable region having a periphery. The user interface is adapted to display the first image or the registered second image within the periphery and the other image outside the periphery. The image processing unit is adapted to determine a similarity in alignment of a feature of the registered image with a corresponding feature of the first image, and the user interface is adapted to provide a visual indication to indicate the similarity of the alignment.

20 Claims, 5 Drawing Sheets

IMAGE REGISTRATION SYSTEM WITH MOVABLE REGION INDICATING SIMILARITY OF ALIGNMENT

FIELD

The present embodiments relate to an image registration system and a method of processing an image.

BACKGROUND

In order to compare images of the same scene taken at different times, different viewpoints, and/or by different sensors, registration of the images is performed to transform the images into one coordinate system. Once the images are transformed into a common coordinate system, the features of the images may be compared easily. Image registration is generally used in applications such as computer vision, medical imaging, automatic target registration for military, satellite imaging, remote sensing etc. For example, in medical imaging, image registration may be used for positioning a patient for a medical treatment. The positioning of the patient involves acquiring an image of the patient and comparing the acquired image with a reference image acquired prior to the treatment to determine if the position of the patient for the treatment is the same as the position of the patient in the reference image.

However, in certain aspects, a feature of the acquired image may not be aligned with the corresponding feature of the reference image, and thus, an offset in alignment may exist. Thus, the comparison of the acquired image with the reference image may not be accurate.

SUMMARY

In one embodiment, an image registration system includes a memory having stored therein digital data representing a first image and a second image. The image registration system also includes an image processing unit configured to register the second image onto a coordinate system of the first image to obtain a registered second image, and a user interface device adapted to display one of the first image or the registered second image and a movable region having a periphery. The user interface is adapted to display the first image or the registered second image within the periphery and the other image outside the periphery. The image processing unit is adapted to determine a similarity in alignment of a feature of the registered second image with a corresponding feature of the first image, and the user interface device is adapted to provide a visual indication to indicate the similarity of the alignment.

In another embodiment, a method of processing an image includes receiving digital data representing a first image and a second image, registering the second image onto a coordinate system of the first image to obtain a registered second image, and displaying one of the first image or the registered second image, and a movable region having a periphery. The first image or the registered image is displayed within the periphery, and the other outside the periphery. The method also includes determining a similarity in alignment of a feature of the registered second image with a corresponding feature of the first image and providing a visual indication of the similarity of the alignment.

In yet another embodiment, a computer program product includes one or more tangible computer readable media, encoded with instructions operative to cause a computer to receive digital data representing a first image and a second image, register the second image to a coordinate system of the first image to obtain a registered second image, and display one of the first image or the registered second image, and a movable region having a periphery. The first image or the registered image is displayed within the periphery and the other outside the periphery. The instructions are also operative to cause the computer to determine a similarity in alignment of a feature of the registered second image with a corresponding feature of the first image and provide a visual indication of the similarity of the alignment.

BRIEF DESCRIPTION OF THE DRAWINGS

The present embodiments are further described hereinafter with reference to illustrated embodiments shown in the accompanying drawings, in which.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
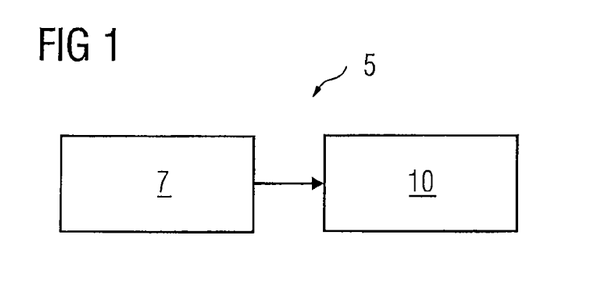
FIG. 1 illustrates a block diagram of an imaging system according to an embodiment herein.

FIG. 1 illustrates an imaging system according to an embodiment herein. The imaging system 5 includes an acquisition device 7 operably coupled to an image registration system 10. The acquisition device 7 acquires the image that is to be registered and provides the image to the image registration unit 10. The image registration unit 10 receives the acquired image for registration and registers the acquired image onto a reference image. For example, in medical applications, the acquisition device may be a computer tomography (CT) scanner for acquiring CT images of a patient, magnetic resonance (MR) scanner for acquiring MR images, single-photon emission computer tomography (SPECT) scanner for acquiring SPECT images, positron emission tomography (PET) scanner for acquiring PET images, and the like. The reference image is hereinafter referred to as the first image, and the image to be registered is hereinafter referred to as the second image.

Figure 2:
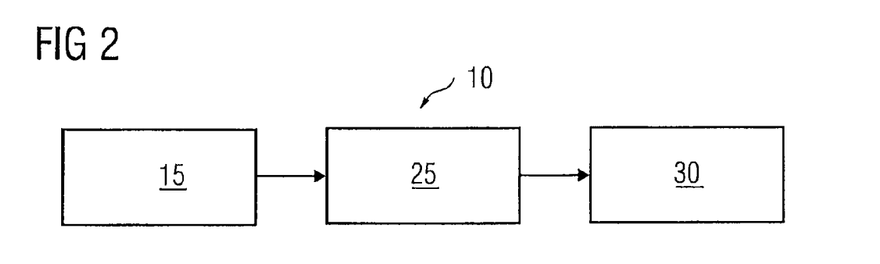
FIG. 2 illustrates an exemplary block diagram of an image registration system according to an embodiment herein.

FIG. 2 illustrates an exemplary block diagram of an image registration system 10 according to an embodiment herein. The system 10 comprises a memory 15, an image processing unit 25 and a user interface device 30. The memory 15 may be used to store the first image and the second image. The first image may be acquired by a respective acquisition device and provided to the memory 15 for storage. Typically, the first image (e.g., the reference image) is acquired earlier than the second image. For example, for patient positioning in oncology treatment, the first image is acquired before the treatment and the second image is acquired during the treatment for accurate positioning of the patient. The image processing unit 25 is operably coupled to the memory 15 and is configured to register the second image onto the first image to obtain a registered second image. The image processing unit 25 registers the second image onto a coordinate system of the first image. The registration of the images may be performed using an image registration algorithm. The user interface device 30 is operably coupled to the image processing unit 25 and is adapted to display either the first image or the registered second image.

In an aspect, the user interface device 30 is adapted to display a movable region having a periphery. The movable regions may include any shape. In an aspect, the shape of the movable region may be configured as per the inputs received from a user via an input user interface. The user interface device 30 is adapted to display the first image or the registered second image within the periphery of the movable region and the other image outside the periphery of the movable region. For example, in an implementation, the user interface device 30 may be configured to display the registered second image. Within the periphery of the movable region, the first image may be displayed, and outside the periphery of the movable region, the registered second image may be displayed. As the registered second image and the first image are on the same coordinate system, the portions of the images displayed outside and within the periphery of the moving region are the respective portions of the images corresponding to the coordinates within and outside the periphery of the movable region. The movable regions may be positioned at any desired location on the image, and thus, provide the advantage of determining if the features to be aligned are aligned or not.

According to an embodiment, the image processing unit 25 is configured to determine a similarity in alignment of a feature of the registered second image with a corresponding feature of the first image. Similarity in alignment herein refers to determining if the feature of the registered second image is aligned with a corresponding feature of the first image and may include a measure of the similarity. For example, if the registered second image is displayed by the user interface 30, the user may move the movable region to a desired region, for example, onto the feature of the registered second image. The image processing unit 25 determines the similarity in alignment of the feature of the registered second image with the corresponding feature of the first image. As per the determined similarity, the user interface device 30 may be configured to provide a visual indication to indicate the similarity. For example, either the edges of the feature of the registered second image or the edges of the corresponding feature of the first image or both may be highlighted using respective distinct colors to indicate whether the features are aligned or not. The distinct colors may be selected such that the colors visually distinguish if there is similarity in the alignment of the features or not. For example, the color green may be used to indicate similarity in alignment of the features, and the color red may be used to indicate that the features are not aligned. In another embodiment, the image processing unit 25 may use the determined similarity as a feedback to align the features automatically.

Figure 3:
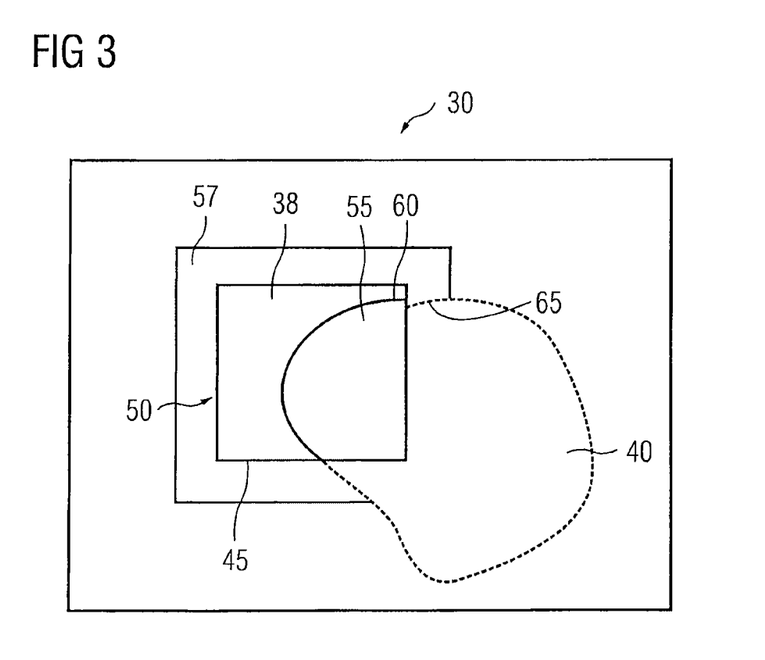
FIG. 3 illustrates an exemplary schematic diagram of a user interface device displaying a registered second image and a movable region according to an embodiment herein.

FIG. 3 illustrates an exemplary schematic diagram of a user interface device displaying a registered second image and a movable region according to an embodiment herein. In the shown example of FIG. 2, the registered second image 35 having a feature 40, illustrated using dotted lines for ease of understanding, is displayed by the user interface 30 of FIG. 1. Within the periphery 45 of the movable region 50, the corresponding portion of the first image 38 is displayed. It may be seen that the corresponding feature 55, illustrated using a continuous line, of the first image 38 is displayed within the periphery 45 of the movable region 50. The determination of the similarity in alignment of the feature 40 and the corresponding feature 55 will be described in detail in the following paragraphs.

In an aspect, the image processing unit 25 of FIG. 1 is configured to detect the edges of the feature 40 and the corresponding feature 55. In certain aspects, the image processing unit 25 may be configured to detect a portion of the edges proximal to the periphery 45. Thus, the image processing unit 25 may be configured to detect the complete edges or a portion of the edges proximal to the periphery 45, and thus, the length of the edges to be detected by the image processing unit 25 may be configured as desired. For example, according to an embodiment, the image processing unit 25 may be configured to identify a region 57 enclosing the movable region 50, and the edges of the feature 40 within the region 57 may be detected. The width of the region 57 around the movable region 57 may be configured as desired. The edge of the corresponding feature 55 is hereinafter referred to as first edge, and is designated as 60. The edge of the feature 40 is hereinafter referred to as second edge, and is designated as 65. In an aspect, the similarity may be determined using a relation of continuity of the first edge 60 and the second edge 65 at the periphery 45.

Advantageously, the relation of continuity includes a first order continuity and a second order continuity. The first order continuity may be used to determine if the first edge 60 and the second edge 65 meet at the periphery 45. In an aspect, the first order continuity may be determined by computing a distance between the first edge 60 and the second edge 65 at the periphery 45. The second order continuity may be used to determine if the slopes of the first edge 60 and the second edge 65 are continuous at the periphery 45 so that the first edge 60 and the second edge 65 relate to corresponding features 40, 55 of the first image 38 and the registered second image 35. For example, the difference in slopes of the first edge 60 and the second edge 65 may be identified by fitting a second order curve on a respective set of points of the first edge 60 and the second edge 65 neighboring to the periphery 45 and computing a least mean square error. If the features 40, 55 are not corresponding features, the least mean square error would be high.

Figure 4:
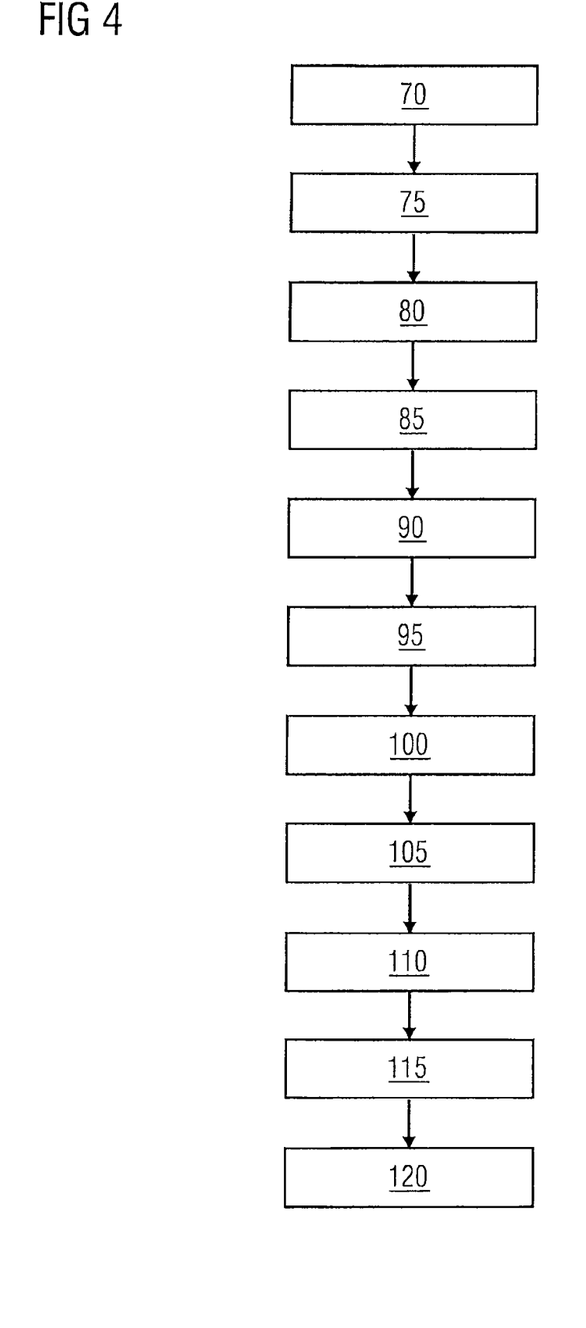
FIG. 4 is a flow diagram illustrating a method of determining a first order continuity and a second order continuity between a first edge and a second edge at a periphery according to an embodiment herein.

FIG. 4, with reference to FIGS. 1 through 3, is a flow diagram illustrating a method of determining the first order continuity and the second order continuity between the first edge 60 and the second edge 65 at the periphery 45 according to an embodiment herein. At block 70, edge points Pe1 and Pe2 of the first edge 60 and the second edge 65, respectively, are identified at the periphery 45. At block 75, a distance between the edge points Pe1 and Pe2 along the periphery 45 is computed. The distance between the first edge 60 and the second edge 65 at the periphery 45 will be zero in case the first edge 55 and the second edge 60 meet at the periphery 45. In an aspect, at block 80, based on the distance, it may be determined if the first edge 60 and the second edge 65 posses first order continuity or not at the periphery 45. In certain aspects, the first edge 55 and the second edge 60 may meet partially at the periphery 45. Thus, in an embodiment, at block 85, the first order continuity may be determined by comparing the distance with a predetermined threshold distance. At block 90, the first edge 60 and the second edge 65 may be classified as not having the first order continuity if the distance is greater than the predetermined threshold and may be classified as having the first order continuity if the distance is less than the predetermined threshold distance. The predetermined threshold distance may be stored at the memory 15 of FIG. 1.

Referring still to FIG. 4, in an aspect, if the first edge and the second edge do not posses first order continuity, the method may be terminated as it is ascertained that the first edge 60 and the second edge 65 do not meet at the periphery 45, and thus, the edges 60, 65 do not posses similar alignment. In case the edges 60, 65 posses first order continuity, the method may further proceed in determining the second order continuity of the edges 60, 65. Accordingly, in an aspect, at block 95, a centroid Pce12 of the edge points Pe1 and Pe2 is computed. The centroid Pce12 of the edge points Pe1 and Pe2 provides the centroid of the edges 60, 65 at the periphery 45. At block 100, a region of interest (ROI) is identified such that the centroid Pce12 is substantially at the center of the ROI. Advantageously, the ROI may be identified as a window having rows and columns constituted by odd number of pixels (e.g., a 9×9 window). At block 105, a first set of points Pe1i on the first edge 60 and a second set of points Pe2j on the second edge 65 within the ROI are detected. For example, if the ROI is a 9×9 window, four points may be detected on each of the edges 60, 65, as the first set of points Pe1i and the second set of points Pe2j, respectively. Identifying the ROI as a window having rows and columns constituted by odd number of pixels provides the advantage of detecting equal number of points on both the edges 60, 65, as the centroid Pce12 of the edge points Pe1 and Pe2 is substantially at the center of the ROI.

Referring still to FIG. 4, at block 110, a second order curve is fitted on the first set of points Pe1i and the second set of points Pe2j using a least mean square algorithm. At block 115, a least mean square error of the fitted second order curve is computed. If the slopes of the first edge 60 and the second edge 65 at the periphery 45 are highly dissimilar, the least mean square error would be higher. Thus, the image processing unit 25 may determine if the first edge 60 and the second edge 65 posses second order continuity. In an embodiment, at block 120, the method may include, comparing the least mean square error with a threshold error and classifying the edges 60, 65 to posses second order continuity if the least mean square error is less than the threshold error and classifying the edges 60, 65 as not possessing second order continuity if the least mean square error is higher than the threshold error.

Figure 5:
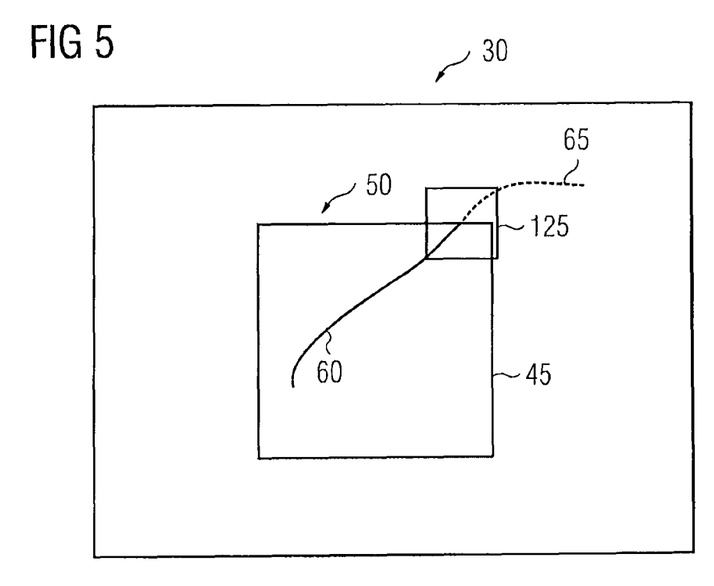
FIG. 5 illustrates a schematic of an exemplary region of interest according to an embodiment herein.

FIG. 5 illustrates a schematic of an exemplary ROI according to an embodiment herein. In the shown example of FIG. 5, an ROI 125 is illustrated on the user interface device 30. The ROI 125 is identified such that the centroid of the first edge 60 and the second edge 65 at the periphery 45 of the movable region 50 is substantially at the center of the ROI 125. The ROI 125 illustrated in the shown example of FIG. 5 is only for illustration purposes and may not be displayed on the user interface device 30 during actual implementation of the image registration system 10 of FIG. 2. The image processing unit 25 of FIG. 2 may identify the ROI 125 and detect the first set of points Pe1i on the first edge 60 of FIG. 3 and the second set of points Pe2j on the second edge 65 of FIG. 3, respectively, within the ROI 125.

Figure 6A:
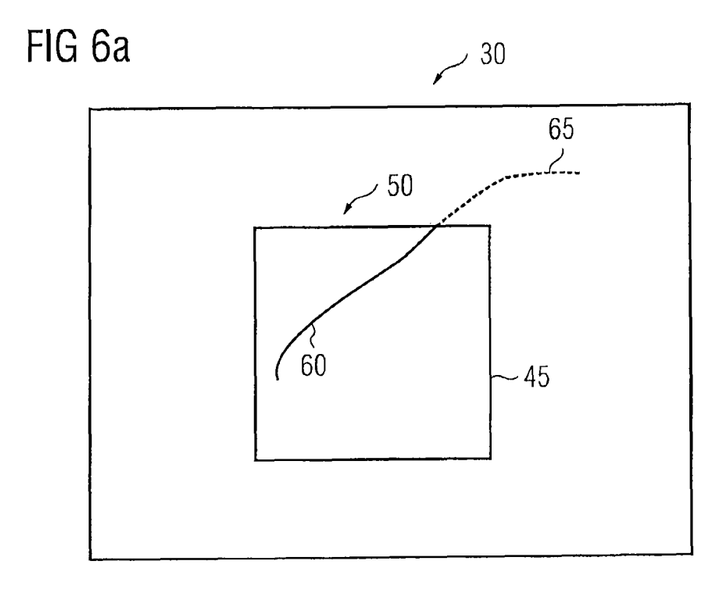
FIG. 6a is a schematic example illustrating a first edge and a second edge wherein the first edge and the second edge posses first order continuity and second order continuity.

FIG. 6a is a schematic example illustrating a first edge 60 and a second edge 65, where the first edge 60 and the second edge 65 posses first order continuity and second order continuity. FIG. 6a shows the first edge 60 and the second edge meeting at the periphery 45 of the movable region 50 displayed by the user interface device 30 of FIG. 2. Thus, the distance between the edges 60, 65 at the periphery 45 is null. Accordingly, the first edge 60 and the second edge 65 posses first order continuity. Additionally, as the slopes of the first edge 60 and the second edge 65 are continuous, the first edge 60 and the second edge 65 posses second order continuity. Thus, the first edge 60 and the second edge 65 are corresponding edges of the same physical feature.

Figure 6B:
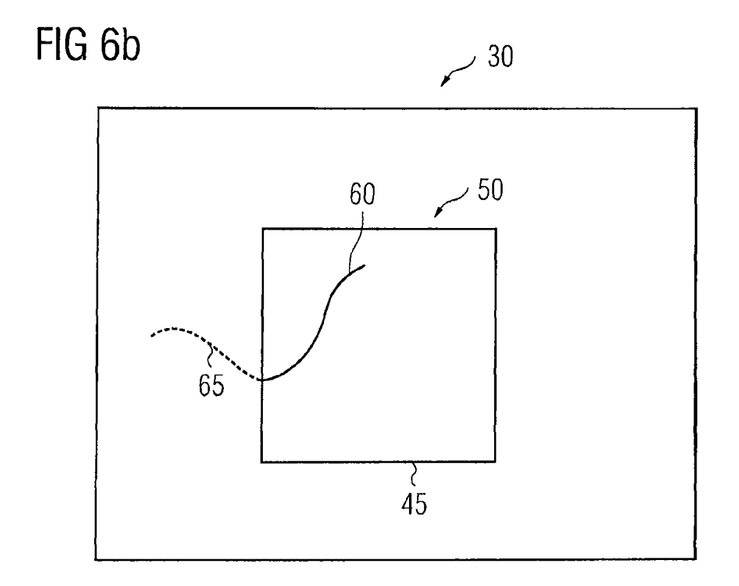
FIG. 6b is a schematic example illustrating a first edge and a second edge wherein the first edge and the second edge posses first order continuity but not second order continuity.

FIG. 6b is a schematic example illustrating a first edge 60 and a second edge 65, where the first edge 60 and the second edge 65 posses first order continuity but not second order continuity. FIG. 6b shows the first edge 60 and the second edge meeting at the periphery 45 of the movable region 50 displayed by the user interface device 30 of FIG. 2. Thus, the distance between the edges 60, 65 at the periphery 45 is null. Accordingly, the first edge 60 and the second edge 65 posses first order continuity. However, as the slopes of the first edge 60 and the second edge 65 differ, the first edge 60 and the second edge 65 do not posses second order continuity. Thus, the first edge 60 and the second edge 65 are not the corresponding edges of the same physical feature.

Figure 6C:
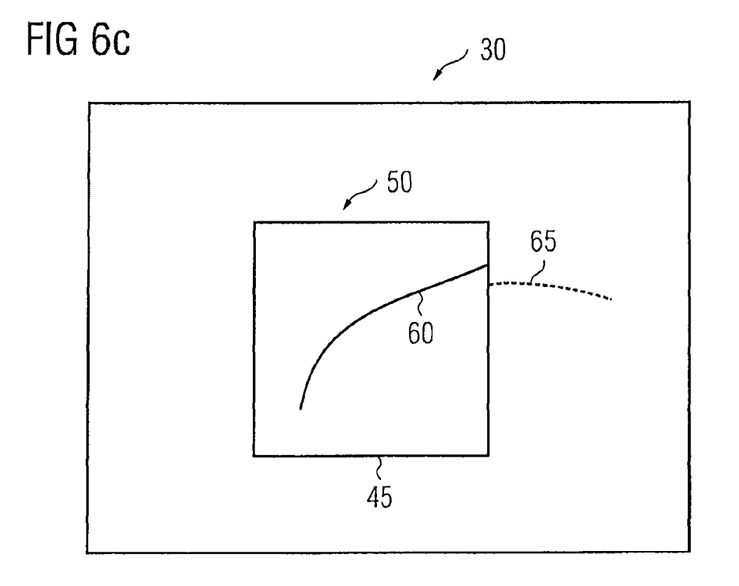
FIG. 6c is a schematic example illustrating a first edge and a second edge wherein the first edge and the second edge do not posses first order continuity and second order continuity.

FIG. 6c is a schematic example illustrating a first edge 60 and a second edge 65, where the first edge 60 and the second edge 65 do not posses first order continuity and second order continuity. FIG. 6c shows the first edge 60 and the second edge 65 not meeting at the periphery 45 of the movable region 50 displayed by the user interface device 30 of FIG. 2. Thus, there is a distance between the edges 60, 65 at the periphery 45. Accordingly, the first edge 60 and the second edge 65 do not posses first order continuity. Additionally, as the slopes of the first edge 60 and the second edge 65 are different, the first edge 60 and the second edge 65 do not posses second order continuity. Thus, the first edge 60 and the second edge 65 are not the corresponding edges of the same physical feature.

Figure 7:
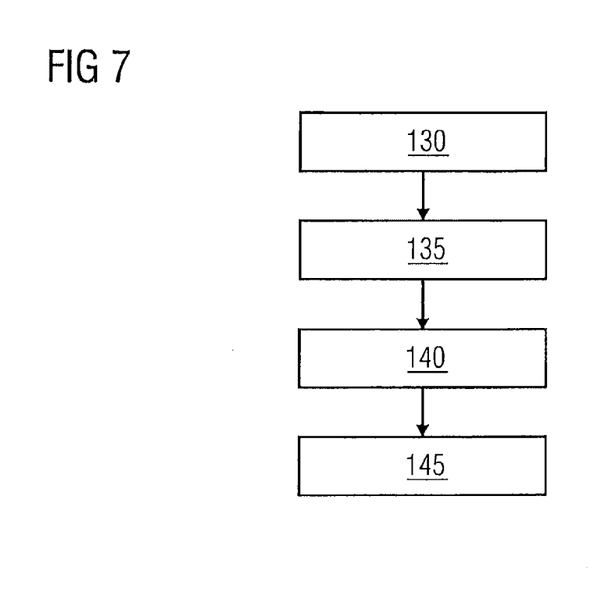
FIG. 7 is a flow diagram illustrating a method of processing an image according to an embodiment herein.

FIG. 7, with reference to FIGS. 1 though 6c, is a flow diagram illustrating a method of processing an image according to an embodiment herein. At act 130, digital data representing a first image 38 and a second image are received. At act 135, the second image is registered to the first image in a common coordinate system to obtain a registered second image 35. At act 140, one of the first image 38 or the registered second image 35, and a movable region 50 having a periphery 45 is displayed, where the first image 38 or the registered image 35 is displayed within the periphery 45 and the other image outside the periphery. At act 145, a similarity in alignment of a feature of the second registered image 35 with a corresponding feature of the first image 38 is determined. At act 150, a visual indication of the similarity of the alignment is provided.

Referring now to FIGS. 1 through 7, the image registration system 10 may be used to register an image onto a reference image 38 and enable correction of dissimilarity in alignment of a feature 40 of the image with respect to the corresponding feature 55 of the reference image 38. For example, once it is determined if the feature 40 is aligned or not with the corresponding feature 55, the user interface device 30 is configured to provide a visual indication of the same. For example, if the first edge 60 and the second edge 65 of the features 40, 55 are similar in alignment, the user interface device 30 may be configured to indicate the same visually by displaying either one or both the edges 60, 65 using a particular color. In case the features 40, 55 have dissimilarity in alignment, the user interface device 30 may be configured to indicate the dissimilarity visually by displaying either one or both the edges 60, 65 using a color different than the one used to indicate the similarity. Thus, the user interface device 30 may be configured to provide visual indication of the features 40, 55 being aligned or not using distinct colors, respectively. A user, on seeing this indication, may ascertain if the features 40, 55 are aligned or not. Additionally, in an embodiment, the user interface device 30 may be configured to display the distance and/or the least mean square error if the features 40, 55 are not aligned. For example, in an aspect, the distance and/or the least mean square error may be displayed as a tooltip when a pointer of the user interface device 30 is hovered over the features 40, 55. In certain applications, such as medical systems, in case the features 40, 55 are not aligned, a user, for example a clinician, may take steps to align the features 40, 55. This may be used for accurate positioning of a patient for a treatment with respect to the reference image. For example, the features 40, 55, in case of a medical application, may be anatomical structures, as the first image 38 and the second image will be medical images.

Referring still to FIGS. 1 though 7 according to an embodiment, in case the first image 38 and the second image are 3D images, the user interface device 30 may further be configured to display a different plane of the first image 38 based on an input received from a user. For example, on determining that a feature 40 of the registered second image 35 does not align with the corresponding feature 55 of the first image 38, the user may verify if the feature 40 of the second registered image is aligned with the corresponding feature 55 of the first image 38 of neighboring planes. Thus, the user desiring to compare the feature 55 with neighboring planes of the first image 38 may change the planes of the first image 38 by providing an input. The user interface device 30, on receiving the input, may be configured to display a neighboring plane of the first image 38. For example, the input to change the plane of the first image 38 may be provided to the user interface device 30 via input devices, such as a mouse, keyboard and the like. Advantageously, in case of a standard mouse, the center button may be configured for this.

The embodiments herein may take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein may take the form of a computer program product accessible from a computer-usable or computer-readable medium providing program code for use by or in connection with a computer or any instruction execution system. For the purposes of this description, a computer-usable or computer readable medium may be any apparatus that may include, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The image registration system may be a data processing system suitable for storing and/or executing program code and includes at least one processor coupled directly or indirectly to memory elements through a system bus. The memory elements may include local memory employed during actual execution of the program code, bulk storage, and cache memories that provide temporary storage of at least some program code in order to reduce the number of times code is be retrieved from bulk storage during execution.

Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems, remote printers or storage devices through intervening private or public networks. Modems, cable modem and Ethernet cards are just a few of the currently available types of network adapters.

Figure 8:
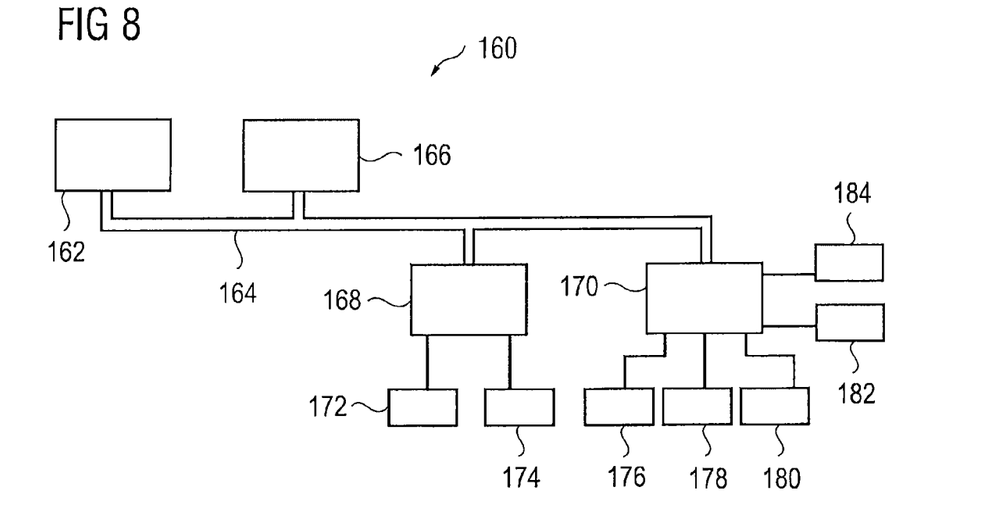
FIG. 8 depicts a representative hardware environment for practicing the embodiments described herein.

FIG. 8 depicts a representative hardware environment for practicing the embodiments described herein. This schematic drawing illustrates a hardware configuration of an information handling/computer system 160 in accordance with the embodiments herein. The system 160 includes at least one processor or central processing unit (CPU) 162. The CPU 162 is interconnected via bus 164 to various devices such as a memory 166, input/output (I/O) controller 168, and user interface controller 170. Depending on the type and configuration of the system 160, the memory 166 may be volatile (e.g., random access memory (RAM) etc.), non-volatile (e.g., read only memory (ROM), flash memory devices etc.,) or a combination of the two. The memory 166 is used to store instructions and data for use by the CPU 162. The I/O controller 168 may connect to peripheral devices, such as CD drives 172 and hard drives 174, or other program storage devices that are readable by the system. Typically, an operating system for the computer system 160 as well as an application program are stored onto the hard drive 174. The operating system runs on the CPU 162 and is used to coordinate and provide control of various components within system 160. The system 160 may read the instructions of the present embodiments on the hard drive 174 and load the instructions onto the memory 166 for execution by the CPU 162. The user interface controller 170 may connect to a keyboard 176, mouse 178, speaker 180, microphone 182, display device 184 and/or other user interface devices such as a touch screen device (not shown) to the bus 164 to gather user input and also to provide system output to the user.

The embodiments described herein provide an image registration system capable of registering an image to a reference image and provide visual indication whether a structure of the registered image is aligned to the corresponding structure of the reference image or not. As the visual indication enables a user to determine whether the structures of the image and the reference image are aligned or not automatically, ascertaining the same by manual observation is eliminated. Moreover, manual observation may introduce error in determination of the alignment. Additionally, the determination of the alignment by manual observation may vary from user to user, and thus, a standard cannot be set. Additionally, providing a visual indication such that it is distinguishable to a user if a structure of an image is aligned with the corresponding structure of the reference image or not, enables the user to align the structures in case they are not aligned. For example, in case a structure of the second image is not aligned to the corresponding structure of the first image, the user may initiate acts for having the same aligned, and the user interface will provide visual indications to distinguish if the features are aligned or not. Once the structures are aligned, the user may stop the alignment process initiated.

For example, in medical applications such as oncology, positioning offsets of the patient may be estimated with respect to the reference image in patient positioning applications, and the offset may be eliminated or reduced so that the position of the patient is aligned with the reference image. For example, the acquisition device 7 of FIG. 1 may acquire an image of the patient for patient positioning purposes, and the acquired image may be registered to the reference image that was acquired prior to the treatment. Once registered, the user, such as a clinician, may distinguish between aligned and non-aligned anatomical structures of the registered image with the corresponding anatomical structures of the reference image because of the visual indication provided. Accordingly, the clinician make take action to correct the position of the patient by aligning the anatomical structures of the registered image with the corresponding anatomical structures of the reference image so that the position of the patient matches to the reference image. The clinician may easily verify if all the anatomical structures of the image acquired for positioning are aligned with the corresponding anatomical structures of the reference image because of the visual indication provided. This enables positioning the patient for treatment in an easy manner.

The foregoing description of the specific embodiments will so fully reveal the general nature of the embodiments herein that others may, by applying current knowledge, readily modify and/or adapt for various applications such specific embodiments without departing from the concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments herein may be practiced with modification within the spirit and scope of the appended claims.

The invention claimed is:

1. An image registration system comprising:
   a memory storing digital data representing a first image and a second image;
   an image processing unit configured to register the second image onto a coordinate system of the first image to obtain a registered second image; and
   a user interface device adapted to display one of the first image or the registered second image, and a movable region having a periphery, the user interface being adapted to display the first image or the registered second image within the periphery and the other image outside the periphery;
   wherein, the image processing unit is adapted to determine a similarity in alignment of a feature of the registered second image with a corresponding feature of the first image only at the periphery of the movable region, and the user interface device is adapted to provide a visual indication to indicate the similarity of the alignment.

2. The image registration system according to claim 1, wherein the image processing unit is configured to:
   detect a first edge of at least a portion of the corresponding feature and a second edge of at least a portion of the feature proximal to the periphery, and
   determine the similarity using a relation of continuity of the first edge and the second edge at the periphery.

3. The image registration system according to claim 2, wherein the relation of continuity includes at least one of a first order continuity and a second order continuity between the first edge and the second edge.

4. The image registration system according to claim 3, wherein the image processing unit is configured to determine a distance between the first edge and the second edge at the periphery to determine the first order continuity.

5. The image registration system according to claim 4, wherein the user interface is configured to provide a visual indication of the distance.

6. The image registration system according to claim 4, wherein the image processing unit is further configured to:
   determine a centroid of the first edge and the second edge at the periphery;
   identify a region of interest such that the centroid is substantially at the center of the region of interest;
   detect a first set of points on the first edge and a second set of points on the second edge within the region of interest;
   fit a second order curve on the first set of points and the second set of points using a least mean square algorithm; and
   compute a least mean square error of the fitted second order curve to determine the second order continuity.

7. The image registration system according to claim 6, wherein the user interface is configured to provide a visual indication of the least mean square error.

8. The image registration system according to claim 1, wherein the user interface is configured to visually indicate the similarity in alignment by displaying at least one of a first edge or a second edge using a distinct color.

9. The image registration system according to claim 1, wherein an image plane of the first image is selectable responsive to a user input.

10. The image registration system according to claim 1, wherein the first image and the second image are medical images and the feature and the corresponding feature are anatomical structures.

11. A method of processing an image, the method comprising:
    receiving digital data representing a first image and a second image;
    registering the second image onto a coordinate system of the first image to obtain a registered second image;
    displaying one of the first image or the registered second image and a movable region having a periphery, wherein the first image or the registered image is displayed within the periphery and the other outside the periphery;
    determining a similarity in alignment of a feature of the registered second image with a corresponding feature of the first image only at the periphery of the movable region; and
    providing a visual indication of the similarity of the alignment.

12. The method according to claim 11, wherein the determination of the similarity includes:
    detecting a first edge of at least a portion of the corresponding feature and a second edge of at least a portion of the feature proximal to the periphery; and
    using a relation of continuity of the first edge and the second edge at the periphery.

13. The method according to claim 12, wherein the use of relation of continuity includes determining at least one of a first order continuity and a second order continuity between the first edge and the second edge.

14. The method according to claim 13, wherein the determination of the first order continuity includes determining a distance between the first edge and the second edge at the periphery.

15. The method according to claim 14, further comprising providing a visual indication of the distance.

16. The method according to claim 13, wherein the determination of the second order continuity includes:
   determining a centroid of the first edge and the second edge at the periphery;
   identifying a region of interest such that the centroid is substantially at the center of the region of interest;
   detecting a first set of points on the first edge and a second set of points on the second edge within the region of interest;
   fitting a second order curve on the first set of points and the second set of points using a least mean square algorithm; and
   computing a least mean square error of the fitted second order curve.

17. The method according to claim 16, further comprising providing a visual indication of the least mean square error.

18. The method according to claim 11, wherein the visual indication of the similarity in alignment is provided by displaying at least one of a first edge or a second edge using a distinct color.

19. The method according to claim 11, further comprising displaying an image plane of the first image responsive to a user input.

20. A computer program product comprising one or more non-transitory computer readable media, encoded with instructions operative to cause a computer to:
   receive digital data representing a first image and a second image;
   register the second image to a coordinate system of the first image to obtain a registered second image;
   display one of the first image or the registered second image, and a movable region having a periphery, wherein the first image or the registered image is displayed within the periphery and the other outside the periphery;
   determine a similarity in alignment of a feature of the registered second image with a corresponding feature of the first image only at the periphery of the movable region; and
   provide a visual indication of the similarity of the alignment.

* * * * *